US012682039B2

(12) United States Patent
Franza et al.

(10) Patent No.: US 12,682,039 B2
(45) Date of Patent: Jul. 14, 2026

(54) CONCEPT FOR MONITORING SOFTWARE CONTAINERS

(71) Applicant: Intel Corporation, Santa Clara, CA (US)

(72) Inventors: Olivier Franza, Brookline, MA (US); David Lombard, Rossmoor, CA (US); Farah Fargo, Hudson, MA (US)

(73) Assignee: Intel Corporation, Santa Clara, CA (US)

( * ) Notice: Subject to any disclaimer, the term of this patent is extended or adjusted under 35 U.S.C. 154(b) by 79 days.

(21) Appl. No.: 17/652,701

(22) Filed: Feb. 28, 2022

(65) Prior Publication Data

US 2022/0366034 A1     Nov. 17, 2022

(51) Int. Cl.
   *G06F 21/00*        (2013.01)
   *G06F 21/52*        (2013.01)
   *G06F 21/55*        (2013.01)

(52) U.S. Cl.
   CPC .............. *G06F 21/52* (2013.01); *G06F 21/55* (2013.01); *G06F 2221/033* (2013.01)

(58) Field of Classification Search
   CPC .... G06F 21/52; G06F 21/55; G06F 2221/033; G06F 21/554
   See application file for complete search history.

(56) References Cited

U.S. PATENT DOCUMENTS

| | | | | |
|---|---|---|---|---|
| 11,017,074 | B2 * | 5/2021 | Cherny | G06F 21/604 |
| 11,240,268 | B1 * | 2/2022 | Lieberman | G06F 21/554 |
| 2018/0260574 | A1 * | 9/2018 | Morello | G06F 9/44505 |
| 2018/0278639 | A1 * | 9/2018 | Bernstein | G06F 21/53 |
| 2022/0171856 | A1 * | 6/2022 | Bhatt | G06F 21/52 |
| 2022/0300330 | A1 * | 9/2022 | White | G06F 21/6272 |

* cited by examiner

*Primary Examiner* — Ghazal B Shehni
(74) *Attorney, Agent, or Firm* — SPL Patent Attorneys PartG; Kieran O'Leary

(57)        ABSTRACT

Examples relate to an apparatus, a device, a method, and a computer program for monitoring one or more software containers being hosted by a computer system, to an apparatus, a device, a method, and a computer program for generating information on an expected behavior of software components of software containers, and to corresponding computer systems. The apparatus for monitoring the one or more software containers comprises processing circuitry configured to determine information on an expected behavior of the one or more software containers based on respective software components being executed or used within the one or more software containers. The processing circuitry is configured to determine information on a monitored behavior of the one or more software containers. The processing circuitry is configured to determine a fault condition of a software container based on a deviation between the expected behavior of the software container and the monitored behavior of the software container.

17 Claims, 4 Drawing Sheets

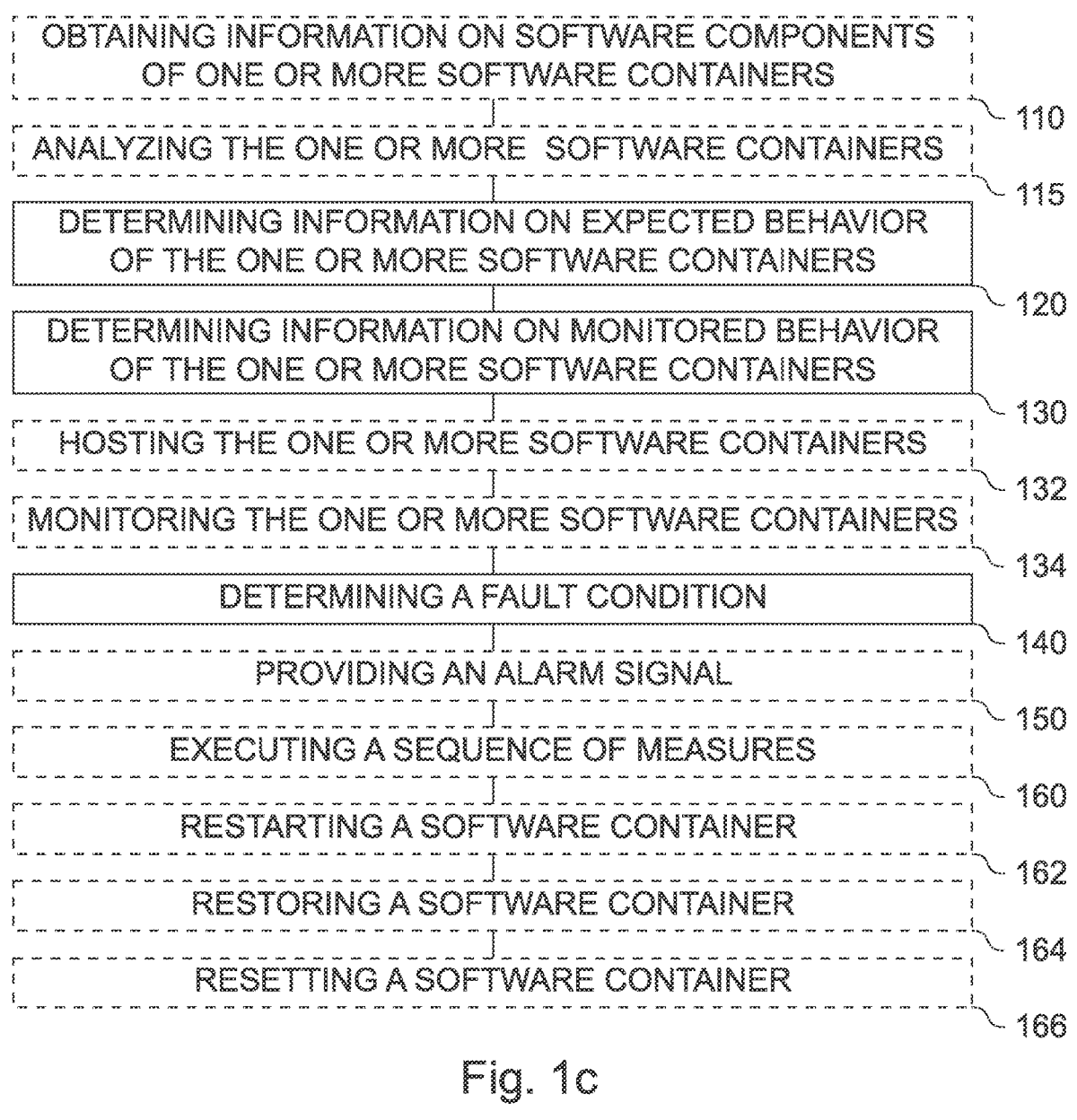

OBTAINING INFORMATION ON SOFTWARE COMPONENTS
OF ONE OR MORE SOFTWARE CONTAINERS
— 110

ANALYZING THE ONE OR MORE SOFTWARE CONTAINERS
— 115

DETERMINING INFORMATION ON EXPECTED BEHAVIOR
OF THE ONE OR MORE SOFTWARE CONTAINERS
— 120

DETERMINING INFORMATION ON MONITORED BEHAVIOR
OF THE ONE OR MORE SOFTWARE CONTAINERS
— 130

HOSTING THE ONE OR MORE SOFTWARE CONTAINERS
— 132

MONITORING THE ONE OR MORE SOFTWARE CONTAINERS
— 134

DETERMINING A FAULT CONDITION
— 140

PROVIDING AN ALARM SIGNAL
— 150

EXECUTING A SEQUENCE OF MEASURES
— 160

RESTARTING A SOFTWARE CONTAINER
— 162

RESTORING A SOFTWARE CONTAINER
— 164

RESETTING A SOFTWARE CONTAINER
— 166

Fig. 1c

CONCEPT FOR MONITORING SOFTWARE CONTAINERS

BACKGROUND

With the rapid growth of cloud computing and high-performance computing (HPC) operating across a large number of servers, concepts for fault-detection and resilient environments may be highly desired. Cyberattacks or system malfunctions can affect system reliability by causing multiple failures, including system crashes, information, and IP (Intellectual Property) thefts, denial of service (DOS), malicious operations, etc. Also, recovery from these can take a long time (or may not even be possible) and can be extremely expensive.

Historically, the focus has been hardware-based faults and errors. Recently, with the increased number of nodes in cloud and HPC systems, faults and errors on the whole system have arisen, that may be detected and resolved. Generic detection system methods have been introduced such as signature-based Intrusion Detection System (IDS), which uses pattern-matching algorithms to compare component attributes like network traffic with an extensive library of attack signatures created by human experts. A match indicates a probable failure. Another method is the anomaly-based IDS technique that builds a model of normal behavior and automatically classifies statistically significant deviations from the normal profile as being abnormal. Also, Resiliency and Redundancy (R&R) methods such as N-version programming and duplication have been used where redundancy helps tolerate successful faults or errors by having a redundant version of the software running on a redundant node.

Many existing fault detection solutions are resilient against specific types of failures and can fall short of detecting problems outside of their focus. Signature-based techniques are proficient in detecting known failures because they can identify an error/attack as soon as it occurs. However, they cannot detect failures outside of their signature databases. For a newly discovered attack, it takes time to develop signatures and deploy them into the existing IDS. For anomaly-based IDS techniques, statistical system monitoring typically requires a training phase on a given system before they can be engaged. Anomaly-based IDS methods can further require relatively consistent operational behaviors in case the statistics are rendered invalid and generate excessive false positives or negatives. Large changes in system behavior may well require retraining. Also, resiliency and redundancy techniques often only cover anomaly detection against certain type of attacks or failures, or they can be expensive to the end user if they are based on existing methods.

BRIEF DESCRIPTION OF THE FIGURES

Some examples of apparatuses and/or methods will be described in the following by way of example only, and with reference to the accompanying figures, in which

FIGS. 1b and 1c shows flow diagrams of examples of a method for monitoring one or more software containers being hosted by a computer system;

DETAILED DESCRIPTION

Figure 1A:
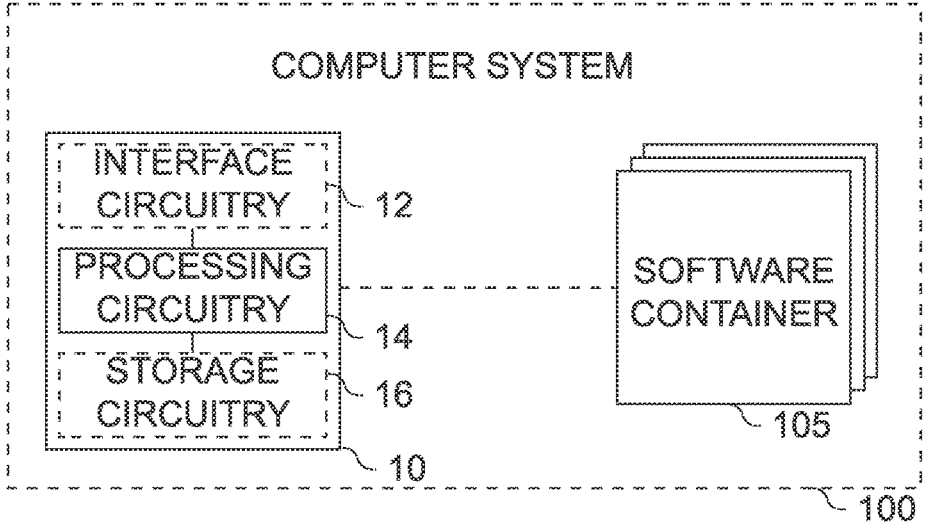
FIG. 1a shows a block diagram of an example of an apparatus or device for monitoring one or more software containers being hosted by a computer system, and of the corresponding computer system comprising the apparatus or device.

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an "or", this is to be understood as disclosing all possible combinations, i.e., only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

In the following description, specific details are set forth, but examples of the technologies described herein may be practiced without these specific details. Well-known circuits, structures, and techniques have not been shown in detail to avoid obscuring an understanding of this description. "An example/example," "various examples/examples," "some examples/examples," and the like may include features, structures, or characteristics, but not every example necessarily includes the particular features, structures, or characteristics.

Some examples may have some, all, or none of the features described for other examples. "First," "second," "third," and the like describe a common element and indicate different instances of like elements being referred to. Such adjectives do not imply element item so described must be in a given sequence, either temporally or spatially, in ranking, or any other manner. "Connected" may indicate elements are in direct physical or electrical contact with each other and "coupled" may indicate elements co-operate or interact with each other, but they may or may not be in direct physical or electrical contact.

As used herein, the terms "operating", "executing", or "running" as they pertain to software or firmware in relation to a system, device, platform, or resource are used interchangeably and can refer to software or firmware stored in one or more computer-readable storage media accessible by the system, device, platform, or resource, even though the instructions contained in the software or firmware are not actively being executed by the system, device, platform, or resource.

The description may use the phrases "in an example/ example," "in examples/examples," "in some examples/ examples," and/or "in various examples/examples," each of which may refer to one or more of the same or different examples. Furthermore, the terms "comprising," "including," "having," and the like, as used with respect to examples of the present disclosure, are synonymous.

FIG. 1a shows a block diagram of an example of an apparatus 10 or device 10 for monitoring one or more software containers 105 being hosted by a computer system 100. The apparatus 10 comprises circuitry that is configured to provide the functionality of the apparatus 10. For example, the apparatus 10 of FIGS. 1a and 1b comprises (optional) interface circuitry 12, processing circuitry 14 and (optional) storage circuitry 16. For example, the processing circuitry 14 may be coupled with the interface circuitry 12 and with the storage circuitry 16. For example, the processing circuitry 14 may be configured to provide the functionality of the apparatus, in conjunction with the interface circuitry 12 (for exchanging information, e.g., with other components of the computer system, such as the containers) and the storage circuitry (for storing information) 16. Likewise, the device 10 may comprise means that is/are configured to provide the functionality of the device 10. The components of the device 10 are defined as component means, which may correspond to, or implemented by, the respective structural components of the apparatus 10. For example, the device 10 of FIGS. 1a and 1b comprises means for processing 14, which may correspond to or be implemented by the processing circuitry 14, (optional) means for communicating 12, which may correspond to or be implemented by the interface circuitry 12, and (optional) means for storing information 16, which may correspond to or be implemented by the storage circuitry 16.

The processing circuitry or means for processing 14 is configured to determine information on an expected behavior of the one or more software containers based on respective software components being executed or used within the one or more software containers. The processing circuitry or means for processing 14 is configured to determine information on a monitored behavior of the one or more software containers. The processing circuitry or means for processing 14 is configured to determine a fault condition of a software container based on a deviation between the expected behavior of the software container and the monitored behavior of the software container. Optionally, the processing circuitry or means for processing 14 is configured to obtain information on software components being executed or used within the one or more software containers.

FIG. 1a further shows the computer system 100 comprising the apparatus or device 10. The computer system is configured to host (e.g., to provide an execution environment and execute) the one or more software containers 105.

Figure 1B:
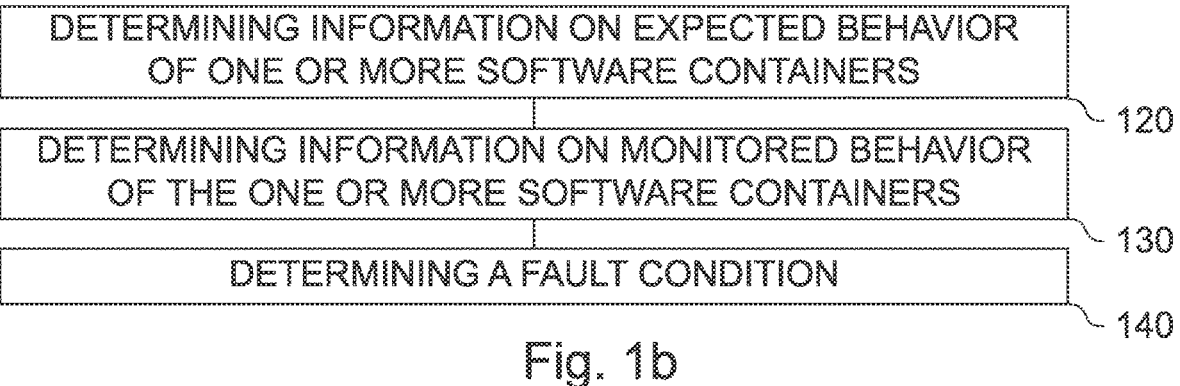

FIGS. 1b and 1c shows flow diagrams of examples of a corresponding method for monitoring one or more software containers being hosted by a computer system. The method comprises determining 120 the information on an expected behavior of the one or more software containers based on the respective software components being executed or used within the one or more software containers. The method comprises determining 130 the information on the monitored behavior of the one or more software containers. The method comprises determining 140 the fault condition of a software container based on a deviation between the expected behavior of the software container and the monitored behavior of the software container. Optionally, the method comprises obtaining 110 the information on software components being executed or used within the one or more software containers.

In the following, the functionality of the apparatus 10, the device 10, the method and of a corresponding computer program is illustrated with respect to the apparatus 10. Features introduced in connection with the apparatus 10 may likewise be included in the corresponding device 10, method and computer program.

The present disclosure relates to a concept for monitoring software containers. Software containers (short "containers") are units of software that encapsulate both an application program, such as a server application program, and all of the dependencies being used by said application program, such as software libraries, files etc. Software containers are executed as isolated user space instances, i.e., they are executed in user space, on top of an operating system being used to host the containers. Therefore, containers are also referred to as Operating System (OS)-level virtualization, in contrast to virtual machines, which comprise a virtualization of an entire computer system. Software containers are particularly known for use on servers and developer devices. For example, such containers may be provided by various container engines (such as Docker, Podman, or Crio).

These software containers are monitored, i.e., one or more metrics are determined and tracked that indicate the behavior of the one or more software containers, such as metrics indicating at least one of a central processing unit (CPU) usage, a graphics processing unit (GPU) usage, a random-access memory (RAM) usage, a storage usage, a number of instructions being executed, a usage of one or more software libraries, a network activity and a file access activity of the respective software container of the respective software container(s). In some other concepts, such metrics could be compared to a workload-specific model that is built on a "normal" (or expected) behavior of the respective software containers, with the model being developed over time on the computer system hosting the software containers. However, such an approach takes time to train or aggregate the respective models, which may have to be repeated once the composition of the containers being hosted changes or once the containers are updated. Therefore, during the training, the fault detection may be unreliable or not available.

In the present disclosure, a different approach is chosen: Instead of developing (e.g., training or aggregating) a model in situ in the computer system, the expected behavior of the one or more software containers is pieced together from information on the expected behavior of the software components being used within the containers. In general, such software containers are used to provide a service for one or more clients, with the service being provided by a server application. Such a software application, which is a software component, may utilize one more further software components, such as one or more software libraries, or one or more software applications, to provide said service. For example, a software application generating and providing websites (i.e., a web server) may use a software library for providing encrypted connections. In addition, or alternatively, the software application may access a database via another software application being included in the container or may instruct another software application to compile server-side code and serve the result. All of these software applications and software libraries may be included in the same container. Accordingly, the software components may comprise at least one of one or more software processes being executed in the respective software container and one or more software libraries being used in the respective software container. A software process may correspond to a software application being executed. The expected behavior of such a software container may thus be based on the (plurality of) software components included in the container.

To determine the expected behavior of the one or more software containers, the software components of said one or more software containers may thus be determined. In other words, the processing circuitry may be configured to obtain information on the software components being executed or used within the one or more software containers. In general, the software components may be determined by analyzing the software containers. For example, the processing circuitry may be configured to analyze the one or more software containers to determine the software components being executed or used in the one or more software containers. Accordingly, as shown in FIG. 1c, the method may comprise analyzing 115 the one or more software containers to determine the software components being executed or used in the one or more software containers. For example, the files included in the respective software container(s) may be analyzed to determine the software components. Alternatively, a manifest (i.e., a description) or a definition of different layers of the software containers may be analyzed to determine the software containers.

Based on the software components, the information on the expected behavior may be determined. In general, the (expected or monitored) behavior may relate to one or more of a central processing unit usage (e.g., CPU usage time, CPU usage percentage), a graphics processing unit usage (e.g., number of kernels, amount of graphics memory, number of memory copy operations, GPU usage time), a random-access memory usage (e.g., amount of memory, cache hit/miss rate), a storage usage (e.g., amount of storage space used, number of files), a number of instructions being executed, a usage of one or more software libraries, a network activity (e.g., frequency and/or amount of network activity) and a file access activity (e.g., how many files, which files are accessed) of the respective software container. Accordingly, the information on the expected behavior may comprise a model and/or metrics characterizing the expected behavior, e.g., a model or metrics characterizing the at least one of the central processing unit usage, a graphics processing unit usage, a random-access memory usage, a storage usage, a number of instructions being executed, a usage of one or more software libraries, a network activity, and a file access activity of the respective software container. However, in various examples, the behavior might not be limited to the behavior of the software (alone). In many cases, the software components also affect the behavior of hardware components of the computer system, such as an energy draw of the CPU or GPU. Accordingly, the expected behavior and the monitored behavior may include the behavior of one or more hardware devices of the computer system, the behavior being caused by the software components being executed or used in the one or more software containers. Thus, the expected behavior of the software components may also be used to identify faulty behavior of hardware components (in addition to faulty behavior of the software containers).

The information on the expected behavior of the one or more software components is determined based on the respective software components being executed or used within the one or more software containers. For example, to determine the information on the expected behavior, a database, or more general data storage, containing information on the expected behavior of the software components, may be used. In other words, the processing circuitry may be configured to determine the information on the expected behavior of the software container based on the respective software components being executed or used within the one or more software containers and based on a data storage comprising information on an expected behavior of software components. In particular, the processing circuitry may be configured to aggregate (e.g., piece together) the expected behavior of a software container from the expected behavior of the software components included in the software container, e.g., by combining the expected behavior of the software components. Such a combination is particularly feasible if the information on the expected behavior of the software components is defined by metrics, which may be readily combined to determine the metrics of the expected behavior of the software container. Accordingly, the information on the expected behavior of the software components may comprise metrics characterizing the expected behavior of the software components. Again, the metrics may relate to one or more of a central processing unit usage, a graphics processing unit usage, a random-access memory usage, a storage usage, a number of instructions being executed, a usage of one or more software libraries, a network activity, and a file access activity of the respective software component. The metrics of the individual software components contained in a software container may then be combined to obtain the metrics of the expected behavior of the (entire) software container. In other words, the processing circuitry may be configured to determine a combination of the expected behavior of the software components being executed or used in a software container to determine the information on the expected behavior of the software container. In effect, the expected behavior of the software container may be derived from the behavior of the software components included in the software container.

In Docker and other software container frameworks, containers can be composed from multiple pre-defined building blocks, i.e., the container can be built by combining multiple building blocks. For example, in Docker, multiple "layers" can be combined in a single container. For example, a container may comprise a layer for providing a user interface (e.g., a web server), a layer for processing information (e.g., an interpreter for interpreting a scripting language or a pre-compiled computer program), and a layer for storing the information (e.g., a database). These layers may be combined to form a container. A layer may comprise one or more software components (e.g., a software application and zero or more software libraries each). In other words, the processing circuitry may be configured to, if a software container is generated or composed from two or more building blocks or layers, determine the information on the expected behavior of the software container based on the expected behavior of the software components being executed or used in the two or more building blocks or layers. For example, to determine the expected behavior of the container, the behavior of the software components of a layer (or building blocks) may be combined to determine the expected behavior of the layer, and the expected behavior of the layers may be combined to determine the expected behavior of the container comprising the layers.

In contrast to other approaches, the information on the expected behavior of the software components may be a priori information, i.e., information that is known before the software container including the respective software components is first hosted by the computer system. In other words, the information on the expected behavior of the software components may be (or may have been) determined before hosting of the one or more software containers by the computer system. In particular, the information on the expected behavior of the software components may originate from outside the computer system. For example, the information on the expected behavior of the software components may be generated by the apparatus, device, method, and corresponding computer program described in connection with FIGS. 2*a* and 2*b*. The information on the expected behavior of the software components may be downloaded from a repository being used to host the respective containers. In other words, the processing circuitry may be configured to obtain (e.g., download) the information on the expected behavior of the software components from another computer, e.g., a from a remote server. In contrast, information on the monitored behavior of the one or more software containers is determined during hosting of the one or more software containers, by the computer system.

The processing circuitry is configured to determine the information on a monitored behavior of the one or more software containers. In general, the behavior of the one or more software containers may be monitored by the computer system hosting the one or more software containers. For example, the processing circuitry may be configured to obtain the information on the monitored behavior of the one or more software containers from another component of the computer system, e.g., from a container hosting platform of the computer system. Alternatively, the processing circuitry may be configured to monitor the behavior of the one or more software containers, e.g., by monitoring the CPU usage, GPU usage, RAM usage, storage usage, file access activity, network activity etc. on a per-container basis. In other words, the processing circuitry may be configured to monitor the behavior of the one or more software containers to determine the information on the monitored behavior of the one or more software containers. For example, this may be the case if the processing circuitry is also used to host the one or more software containers. In other words, the processing circuitry may be configured to host the one or more software containers. For example, the processing circuitry may correspond to a CPU of the computer system, which may be used both to host the one or more software containers and to provide the functionality of the apparatus. Accordingly, the method may comprise hosting 132 the one or more software containers. The method may comprise monitoring 134 the behavior of the one or more software containers to determine the information on the monitored behavior of the one or more software containers.

In the proposed concept, a fault may be detected (i.e., a fault condition of a software container may be determined) by comparing the actual (i.e., monitored) behavior of the one or more software containers with the expected behavior of the one or more software containers. In particular, the processing circuitry may be configured to determine a deviation between the expected behavior of the software container and the monitored behavior of the software container, and to determine the fault detection (e.g., to detect a fault) based on a deviation. However, small deviations may be ignored, as some inaccuracy and variation may be unavoidable. Therefore, the deviation may be compared to a threshold, which may be used to determine whether a deviation corresponds to an (ignorable) deviation or to a deviation severe enough to be considered a fault condition. Accordingly, the processing circuitry may be configured to determine a fault condition if the deviation between the expected behavior of the software container and the monitored behavior of the software container surpasses a threshold. In other words, if the deviation is within the bounds set by the threshold, the behavior may be considered normal, i.e., no fault condition may be determined. If, however, the deviation surpasses the threshold, a fault condition is determined. In general, the threshold may be defined in relation to the above-referenced metrics, e.g., as an absolute (i.e., a number) or relative (i.e., a percentage) value. While a default threshold may be used, such as 10% allowed deviation or 20% allowed deviation, the workload is usually best understood by the engineer or operator administering the computer system. Accordingly, the threshold may be a user-defined threshold.

As long as no fault condition is determined, the operation of the one or more software containers may continue unimpeded. If, however, a fault condition is determined, different measures may be taken to alert the engineer or operator, or to attempt to remedy the fault.

For example, the processing circuitry may be configured to provide an alarm signal if a fault condition is determined. Accordingly, the method may comprise providing 150 an alarm signal if a fault condition is determined. For example, the alarm signal may be provided to alert the user of the fault. For example, the alarm signal may be used to trigger sending an email, to generate an entry in a log file, and/or to update a status in a status dashboard.

In addition, or alternatively, attempts may be made to remedy the fault condition. In the following, three actions are introduced, in the order of the severity of the actions.

As a least disruptive measure, the container may be restarted. In other words, the processing circuitry may be configured to restart the software container the fault condition is determined for if a fault condition is determined. Accordingly, the method comprises restarting 162 the software container the fault condition is determined for if a fault condition is determined. For example, when the container is restarted, a fault condition being caused by a bug in a software component, e.g., a memory leak, may be resolved.

Alternatively, or additionally, if the restart did not remedy the fault condition, the software container may be restored from a backup or snapshot taken from a time where no fault condition is determined. In other words, the processing circuitry may be configured to restore the software container the fault condition is determined for to a previous state if a fault condition is determined. Accordingly, as further shown in FIG. 1*c*, the method may comprise restoring 164 the software container the fault condition is determined for to a previous state if a fault condition is determined. For example, the computer system or the processing circuitry may be configured to routinely take snapshots/backups of the one or more containers, and to revert to a snapshot or backup taken at a time where no fault condition is determined. By restoring the container to a previous (non-initial state), the data and/or settings of the container may also be restored to said previous stage, avoiding data loss (up to a point).

A more severe option is to entirely reset the software container. The processing circuitry may be configured to reset the software container the fault condition is determined for to an initial state if a fault condition is determined. Accordingly, the method may comprise resetting 166 the software container the fault condition is determined for to an initial state if a fault condition is determined. For example, the software container may be reset to the initial state by recreating the software container from one or more images. When the software container is reset to the initial state, the data generated after the container has been initialized may be lost. Therefore, the working data may be restored in the container after the container has been reset.

As outlined above, the above-mentioned measures are ordered in terms of their severity. While a restart may result in some downtime for the container, data loss may be averted. A restoration to a previous state may result in some data loss, i.e., for data generated between the previous state and the current point in time. A reset may result in loss of data for any data generated after initialization of the software container. However, in many cases, said data loss in the latter two cases may be reversed by restoring the data from a redundant system (e.g., if the container is one of a plurality of containers being tasked to perform the same task for a multitude of clients), at the expense of additional downtime. In the proposed concept, an approach may be chosen where a less severe action is performed first in an attempt to remedy the fault, followed by the next more severe action, and finally the most severe action, until the fault is resolved. The processing circuitry may be configured to execute a sequence of measures including restarting the software container, restoring the software container to a previous state, and resetting the software container to an initial state as long as the fault condition is not resolved by a previous measure. Accordingly, as further shown in FIG. 1c, the method may comprise executing 160 a sequence of measures including restarting 162 the software container, restoring 164 the software container to a previous state, and resetting 166 the software container to an initial state as long as the fault condition is not resolved by a previous measure. For example, after restarting the container, the behavior of the restarted container may be compared with the expected behavior of the container. If the deviation persists, the container may be restored to the previous state. After restoring the container to the previous state, the behavior of the restored container may be compared with the expected behavior of the container. If the deviation persists, the container may be reset. In some examples, one of the measures (e.g., restarting, restoring, or resetting) may be omitted from the sequence.

If the fault cannot be resolved by the most server action (i.e., the resetting of the container), the fault condition may be deemed to be due to malfunctioning hardware.

The interface circuitry 12 or means for communicating 12 may correspond to one or more inputs and/or outputs for receiving and/or transmitting information, which may be in digital (bit) values according to a specified code, within a module, between modules or between modules of different entities. For example, the interface circuitry 12 or means for communicating 12 may comprise circuitry configured to receive and/or transmit information.

For example, the processing circuitry 14 or means for processing 14 may be implemented using one or more processing units, one or more processing devices, any means for processing, such as a processor, a computer or a programmable hardware component being operable with accordingly adapted software. In other words, the described function of the processing circuitry 14 or means for processing may as well be implemented in software, which is then executed on one or more programmable hardware components. Such hardware components may comprise a general-purpose processor, a Digital Signal Processor (DSP), a micro-controller, etc.

For example, the storage circuitry 16 or means for storing information 16 may comprise at least one element of the group of a computer readable storage medium, such as a magnetic or optical storage medium, e.g., a hard disk drive, a flash memory, Floppy-Disk, Random Access Memory (RAM), Programmable Read Only Memory (PROM), Erasable Programmable Read Only Memory (EPROM), an Electronically Erasable Programmable Read Only Memory (EEPROM), or a network storage.

For example, the computer system 100 may be a server computer system, i.e., a computer system being used to serve functionality, such as the containers, to one or client computers.

For example, the computer system may be a computer system being used in a cloud or edge computing environment.

More details and aspects of the apparatus, device, method, and corresponding computer program are mentioned in connection with the proposed concept, or one or more examples described above or below (e.g., FIGS. 2a to 3). The apparatus, device, method, and corresponding computer program may comprise one or more additional optional features corresponding to one or more aspects of the proposed concept, or one or more examples described above or below.

Figure 2A:
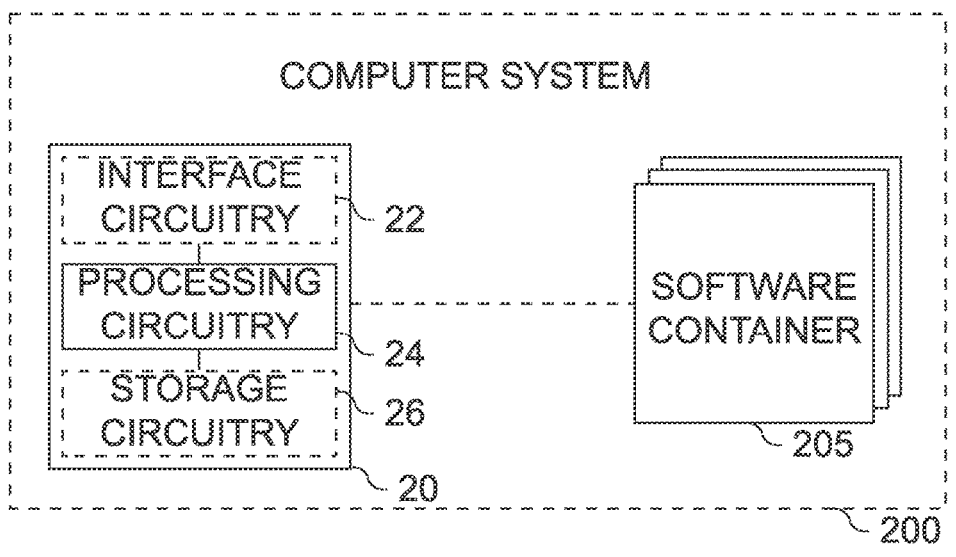
FIG. 2a shows a block diagram of an example of an apparatus or device for generating information on an expected behavior of software components of software containers, and of the corresponding computer system comprising the apparatus or device.

FIG. 2a shows a block diagram of an example of an apparatus 20 or device 20 for generating information on an expected behavior of software components of software containers 205, and of a corresponding computer system 200 comprising the apparatus 20 or device 20. The apparatus 20 comprises circuitry that is configured to provide the functionality of the apparatus 20. For example, the apparatus 20 of FIGS. 2a and 2b comprises (optional) interface circuitry 22, processing circuitry 24 and (optional) storage circuitry 26. For example, the processing circuitry 24 may be coupled with the interface circuitry 22 and with the storage circuitry 26. For example, the processing circuitry 24 may be configured to provide the functionality of the apparatus, in conjunction with the interface circuitry 22 (for exchanging information, e.g., with other components of the computer system, such as the containers) and the storage circuitry (for storing information) 26. Likewise, the device 20 may comprise means that is/are configured to provide the functionality of the device 20. The components of the device 20 are defined as component means, which may correspond to, or implemented by, the respective structural components of the apparatus 20. For example, the device 20 of FIGS. 2a and 2b comprises means for processing 24, which may correspond to or be implemented by the processing circuitry 24, (optional) means for communicating 22, which may correspond to or be implemented by the interface circuitry 22, and (optional) means for storing information 26, which may correspond to or be implemented by the storage circuitry 26.

The processing circuitry or means for processing 24 is configured to host one or more software containers. The one or more software containers comprises one or more software components being executed or used in the one or more software containers. The processing circuitry or means for processing 24 is configured to monitor the behavior of the one or more software components being executed or used in the one or more software containers. The processing circuitry or means for processing 24 is configured to determine information on an expected behavior of the one or more software components based on the monitored behavior of the one or more software components.

Figure 2B:
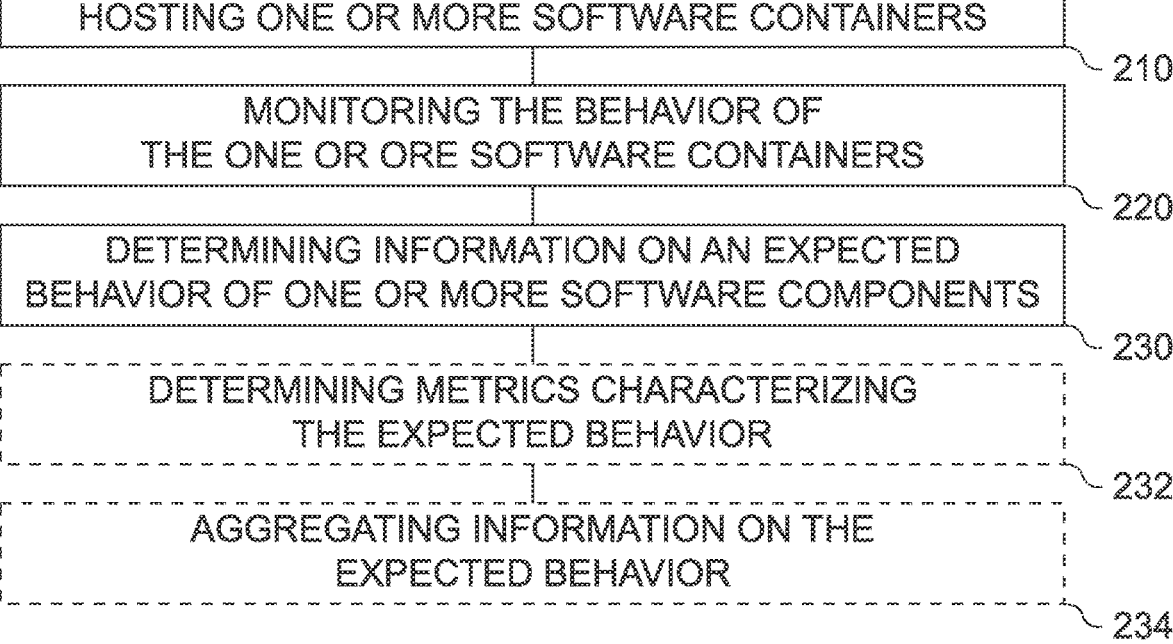
FIG. 2b shows a flow diagram of an example of a method for generating information on an expected behavior of software components of software containers.

FIG. 2*b* shows a flow diagram of an example of a corresponding method for generating information on an expected behavior of software components of software containers. The method comprises hosting 210 the one or more software containers. The method comprises monitoring 220 the behavior of the one or more software components being executed or used in the one or more software containers. The method comprises determining 230 the information on the expected behavior of the one or more software components based on the monitored behavior of the one or more software components.

In the following, the functionality of the apparatus 20, the device 20, the method and of a corresponding computer program is illustrated with respect to the apparatus 20. Features introduced in connection with the apparatus 20 may likewise be included in the corresponding device 20, method and computer program.

While the apparatus, device, method, and computer program of FIGS. 1*a* to 1*c* relate to the monitoring of software containers with the help of information on an expected behavior of software components being used in the software containers, the underlying information on the expected behavior of the software components may be determined by the apparatus 20, device 20, method and computer program of FIGS. 2*a* to 2*b*. In other words, the information on the expected behavior of the software components being used in the software containers may be generated by the apparatus 20, device 20, method and computer program of FIGS. 2*a* to 2*b* to support the monitoring performed by the apparatus, device, method, and computer program of FIGS. 1*a* to 1*c*. Consequently, the information on an expected behavior of software components being used in the software containers may be generated a priori, e.g., before the respective software containers are being hosted by the computer system comprising the apparatus, device, method, and computer program of FIGS. 1*a* to 1*c*.

To determine the information on the expected behavior of the software components, as used in the software containers, the software components may be executed as part of a software container. Accordingly, the processing circuitry is configured to host the one or more software containers, with the one or more software containers comprising one or more software components being executed or used in the one or more software containers. To determine the expected behavior separately for each software component, the software component may be characterized in isolation, e.g., by executing the software component in isolation or with a small (or minimal) set of dependencies. Accordingly, the one or more software containers may include a reduced or minimal set of software components (e.g., as few as possible software components).

The one or more software containers being hosted are them monitored. In particular, the behavior of the one or more software components being executed or used in the one or more software containers are monitored. This may be done by performing the monitoring on a per-software-component basis, e.g., form inside the respective software container. In other words, instead of (or in addition to) monitoring the behavior of the entire software container from the outside, the behavior of the individual software components may be monitored individually from inside the respective software container. For example, a debugging framework may be used to analyze the behavior of software libraries being accessed by a software process in the software container. Alternatively, the behavior of a software library may be characterized in combination with the software process accessing the software library. The behavior of a software process may be monitored directly, e.g., by employing techniques known from command line tools such as "top", or by employing such tools directly.

The information on the expected behavior of the one or more software components is then determined based on the monitored behavior of the one or more software components. As outlined in connection with FIGS. 1*a* to 1*c*, such a behavior may be characterized via metrics or models (that are based on metrics). Therefore, the determination of the expected behavior of the one or more software components may comprise determining the metrics characterizing the behavior of the one or more software components. The processing circuitry may be configured to determine metrics characterizing the expected behavior of the respective software components, and to include the metrics in the information on the expected behavior of the one or more software components. Accordingly, the method may comprise determining 232 metrics characterizing the expected behavior of the respective software components and including the metrics in the information on the expected behavior of the one or more software components. In other words, the metrics may be used to define the information on the expected behavior of the one or more software components. Again, the metrics may relate to one or more of a central processing unit usage, a graphics processing unit usage, a random-access memory usage, a storage usage, a number of instructions being executed, a usage of one or more software libraries, a network activity, and a file access activity of the respective software component.

Software containers are often used as they include a thoroughly tested combination of multiple software components, so that the container can often be used without having to install and configure the individual software components included in the software components. In many cases, the software containers are provided with multiple software components being integrated. Therefore, the information on the expected behavior of the one or more software components may also be provided in aggregated form, e.g., with information on the expected behavior of (all of) the software components included in a particular software container. For example, the processing circuitry may be configured to aggregate, for a software container comprising two or more software components, the information on the expected behavior based on the two or more software components. Accordingly, the method may comprise aggregating 234, for a software container comprising two or more software components, the information on the expected behavior based on the two or more software components.

As outlined in connection with FIGS. 1*a* to 1*c*, containers may be composed from layers or building blocks. Therefore, the information on the expected behavior of the software components used in the layers or building blocks may be aggregated on a per-container basis. The processing circuitry may be configured to aggregate, for a software container comprising two or more building blocks or layers, the information on the expected behavior based on the software components being executed or used in the two or more building blocks or layers. Accordingly, the method comprises aggregating, for a software container comprising two or more building blocks or layers 234, the information on the expected behavior based on the software components being executed or used in the two or more building blocks or layers.

The aggregated information on the expected behavior of the software components of a container may then be provided for monitoring said container, e.g., to the apparatus, device, method, and computer program shown in connection with FIGS. 1a to 1c.

The interface circuitry 22 or means for communicating 22 may correspond to one or more inputs and/or outputs for receiving and/or transmitting information, which may be in digital (bit) values according to a specified code, within a module, between modules or between modules of different entities. For example, the interface circuitry 22 or means for communicating 22 may comprise circuitry configured to receive and/or transmit information.

For example, the processing circuitry 24 or means for processing 24 may be implemented using one or more processing units, one or more processing devices, any means for processing, such as a processor, a computer or a programmable hardware component being operable with accordingly adapted software. In other words, the described function of the processing circuitry 24 or means for processing may as well be implemented in software, which is then executed on one or more programmable hardware components. Such hardware components may comprise a general-purpose processor, a Digital Signal Processor (DSP), a micro-controller, etc.

For example, the storage circuitry 26 or means for storing information 26 may comprise at least one element of the group of a computer readable storage medium, such as a magnetic or optical storage medium, e.g., a hard disk drive, a flash memory, Floppy-Disk, Random Access Memory (RAM), Programmable Read Only Memory (PROM), Erasable Programmable Read Only Memory (EPROM), an Electronically Erasable Programmable Read Only Memory (EEPROM), or a network storage.

More details and aspects of the apparatus, device, method, and corresponding computer program are mentioned in connection with the proposed concept, or one or more examples described above or below (e.g., FIG. 1a to 1c, 3). The apparatus, device, method, and corresponding computer program may comprise one or more additional optional features corresponding to one or more aspects of the proposed concept, or one or more examples described above or below.

Various examples of the present disclosure relate to a smart fault-detection framework for cloud and HPC (High-Performance Computing) environments The proposed smart fault detection framework may use, but is not limited to, container technology and may provide an anomaly behavior analysis to help detect faults or errors in such environments for cloud and HPC systems. The proposed approach offers a method that may provide healthy behavior analysis for each container in cloud and HPC systems.

In the proposed framework, a smart fault detection framework is supplied with the expected (or nominal) behaviors of each container and characteristics of the environment, such as executables, binary codes, libraries, configuration files, security settings processes lists, and network and storage operations. The basis for understanding expected (or nominal) behaviors is the containerized components (i.e., the software components) that make up the software being monitored.

Container technology provides lightweight micro-service virtualization and packaging with less overhead compared to virtual machine technology. Platforms such as Docker, one of the most preferred containerization technologies, can deliver applications and micro-services via identified layers. In the proposed concept, behavior models may be identified for each process based on the constituent framework configuration so that hardware or software errors, faults, or bugs can be more readily identified. The proposed approach may characterize the behavior of each layer (e.g., each software component) in advance of deployment. At the point where applications and micro-services are deployed, the fault detection framework may refer to its a priori knowledge of expected (or nominal) behaviors and characteristics. This way, the normal behavior of each component is known, which may help detect any faults or changes happening to any of the components on runtime.

The proposed smart framework may monitor the container's processes, including processes started by the platform of choice. Using it as an example, Docker can provide information about the processes, including the constituents that can be used to identify each application with the instruction numbers, libraries, and configuration files. The proposed approach shows that it is using different levels to collect the data from a single physical machine (e.g., overall resource utilization, libraries' behavior, number of instructions, etc.) to generate a normal (i.e., expected) behavior model and fault detection system. The knowledge of each application in a container (e.g., the information on the expected behavior of the software component) can include a memory limit, CPU utilization, and security configuration files in setting, etc. Using this information, a behavior model (i.e., information on the expected behavior of the software component) for each process based on its constituent components. In addition, the proposed approach can collect data out of band and in band which can detect a wide range of problems such as machine crashes, disconnected network stacks, hardware failures, application failures, etc.

For this technique, faults and errors may be detected using the proposed smart framework method. The proposed concept may be tested by injecting any type of attack, DOS for example. Once such an attack starts running, it will show in the processes' list. The smart fault detection framework may compare the normal processes' list with the current processes that are running, with the DOS process running not being part of the normal processes list. Then the framework can detect it as it is not part of the normal behavior of the system.

The proposed system may incorporate a priori analysis of containerized software to generate a normal behavior model (i.e., the information on the expected behavior) including a variety of the applications' and micro-services' constituent characteristics to generate the normal behavior analysis that would be used in the proposed fault detection framework.

The proposed framework described above and below may be used to enable fault detection container technology. Container frameworks, such as Docker (one of the most preferred containerization technologies), often provide a "building block" capability that enables a solution to be built across multiple layers. These layers (sometimes called intermediate images) can contain scripts, application binaries, and runtime libraries. Layers can be built directly by end-users or obtained from a repository of pre-packaged layers, such as Docker Hub. With both full containers and constituent layers available in a repository, the proposed smart framework can characterize components, such as application and libraries, in advance of their use on the system after characterizing their normal behavior. This framework can be described from different perspectives:

From the user perspective, the end-users generally have no direct interaction with the kernel. The trusted users may specify some error detection threshold, perhaps the number of threads, maximum runtime, or other characteristics for the workload that the fault detection system will accept. As another example, the user may specify the number of iterations that an application is using along with the acceptance detection (e.g., detection threshold is 90% for instance). Those thresholds are used as an input to the framework that calculates the components measurements along with the user inputs. If the components' measurements are within the error detection threshold, then the framework may accept it and continue to work normally. Otherwise, the framework may be used to drive fault tolerant approaches by restoring a healthy checkpoint of the erroneous/faulty instance.

From the system perspective, the proposed fault detection framework may monitor the processes on run time, in terms of CPU utilization, memory, nodes' communication rate, etc. The framework may compare the current measurement with the monitored data. If the smart fault-detection framework detects that the current behavior is not part of the normal behavior (e.g., an application is using different libraries or binary or mismatch other identified characteristics), it may compare the faults or errors with the error detection threshold that is provided by the user. If the faults or errors are higher than the threshold, then the framework may detect the component(s) of the running instance which is(are) different from the expected normal operation.

Figure 3:
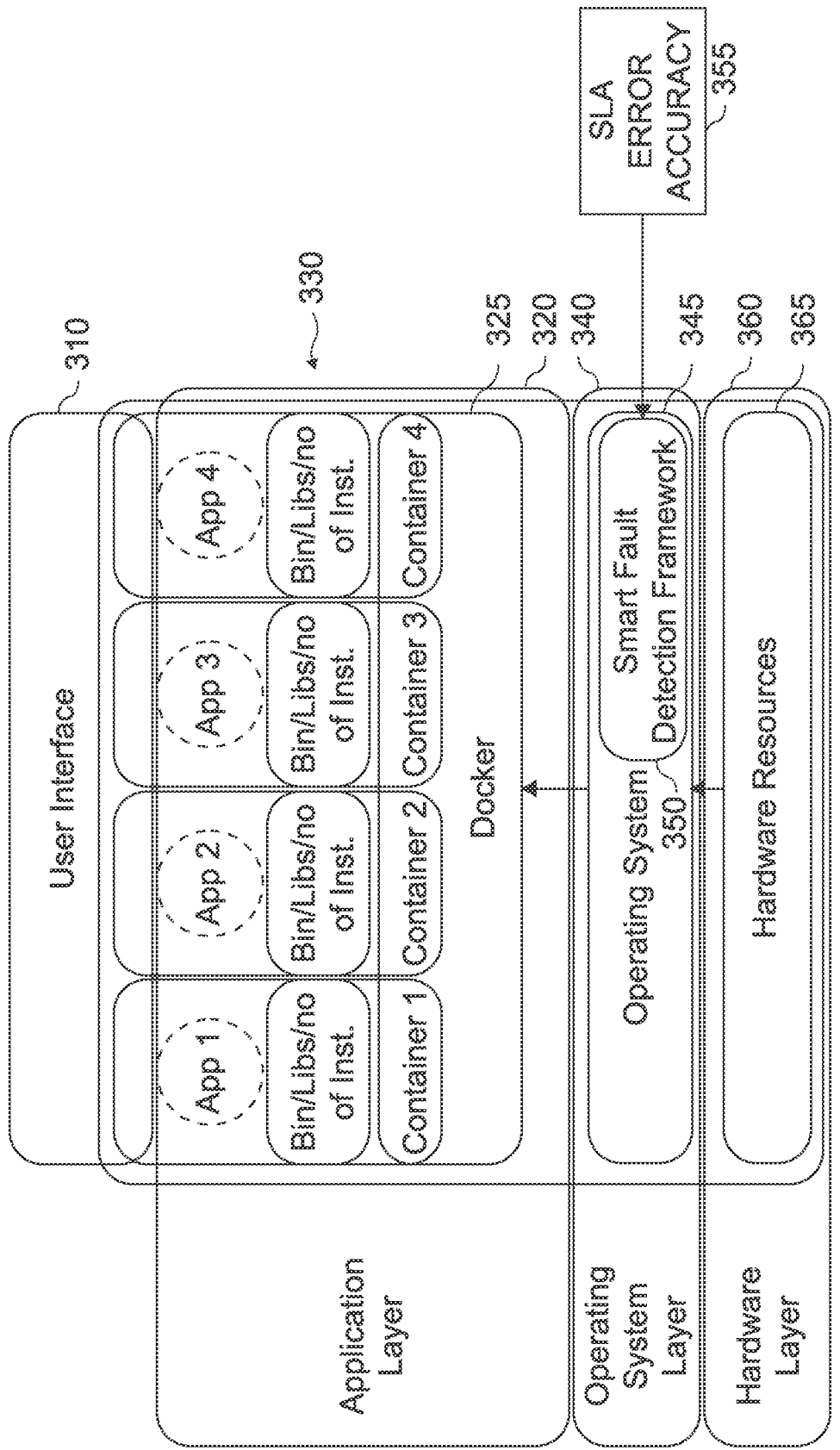
FIG. 3 shows a schematic diagram of an example of a smart fault detection framework.

FIG. 3 shows a schematic diagram of an example of a smart fault detection framework. FIG. 3 shows an example of the smart fault detection architecture with three main layers: hardware 360, operating system 340, and application layers 320. The hardware layer components (i.e., hardware resources) 360 may include CPU (Central Processing Unit), RAM (Random Access Memory), hard disk, motherboard, etc. The operating system layer components 345 may comprise events log, network communications, file accesses, number of users, etc. The application layer components may be number of instructions, binaries, libraries, security configurations, file accesses, etc. Those components from each layer can provide images that can be stored in a database or a containerization platform, like Docker. The proposed framework 350 may reside at the operating system layer 340 (e.g., as part of the operating system 345), and may characterize components and their normal behavior in advance.

As shown in FIG. 3, the application layer 320 includes the Docker 325 technology which has four containers 330 running with specific configurations settings managed by the Docker, each container run an application independently. FIG. 3 shows App1, App2, App3, App4 running on Container1, Container2, Container3, Container4, respectively. They may be accessible via a user interface 310. Each application consumes a specific number of instructions, binary, libraries, security setting, configurations files. The proposed framework may use the stored images (which includes libraries, execution time, binaries, security settings per each container, processes, etc.) and specify the normal (i.e., expected) behavior of each container.

The framework may monitor the processes of each container and stores the normal behavior of each container to be used by the framework. Each container runs an application which uses binary, libraries, and number of instructions that is specified by the user.

For example, App1 may use 2 libraries and takes a 2000-instruction execution time for 2 iterations. A user may specify 2000 instructions for app1 and a 90% error detection threshold (e.g., via Service Level Agreement (SLA) error accuracy 355 shown in FIG. 355). This can be used as an input parameter to the framework (since the user is trusted). If at any point the framework notices that App1 is using more libraries or longer execution time for the same number of instructions and iterations, the framework may compare the components measurements with the normal (i.e., expected) behavior that was generated and may calculate the error percentage compared to the error detection threshold that is specified by the user in order to make the right decision and maintain a fault detection system against faults and errors.

The framework may monitor each container on runtime using its capabilities and compare it with the characterized behavior for each application on each container. The framework may continuously compare the components measurement that the framework uses with the runtime components measurement to identify if there is any abnormal behavior in the system. Once the framework detects that the measurements are different, the error detection threshold may be compared. If the running application measurements is below the threshold, then the framework may accept the error and continue normally. Otherwise, if the measurements are higher than the threshold, then the framework may detect the faults and, for example, reboot that compromised container.

More details and aspects of the smart fault detection framework are mentioned in connection with the proposed concept, or one or more examples described above or below (e.g., FIG. 1a to 2b). The smart fault detection framework may comprise one or more additional optional features corresponding to one or more aspects of the proposed concept, or one or more examples described above or below.

The aspects and features described in relation to a particular one of the previous examples may also be combined with one or more of the further examples to replace an identical or similar feature of that further example or to additionally introduce the features into the further example.

An example (e.g., example 1) relates to an apparatus (10) for monitoring one or more software containers (105) being hosted by a computer system (100), the apparatus comprising processing circuitry (14) configured to determine information on an expected behavior of the one or more software containers based on respective software components being executed or used within the one or more software containers. The processing circuitry is configured to determine information on a monitored behavior of the one or more software containers. The processing circuitry is configured to determine a fault condition of a software container based on a deviation between the expected behavior of the software container and the monitored behavior of the software container.

Another example (e.g., example 2) relates to a previously described example (e.g., example 1) or to any of the examples described herein, further comprising that the software components comprise at least one of one or more software processes being executed in the respective software container and one or more software libraries being used in the respective software container.

Another example (e.g., example 3) relates to a previously described example (e.g., one of the examples 1 to 2) or to any of the examples described herein, further comprising that the processing circuitry is configured to determine the information on the expected behavior of the software container based on the respective software components being executed or used within the one or more software containers and based on a data storage comprising information on an expected behavior of software components.

Another example (e.g., example 4) relates to a previously described example (e.g., example 3) or to any of the examples described herein, further comprising that the information on the expected behavior of the software components comprises metrics characterizing the expected behavior of the software components.

Another example (e.g., example 5) relates to a previously described example (e.g., example 4) or to any of the examples described herein, further comprising that the metrics relate to one or more of a central processing unit usage, a graphics processing unit usage, a random-access memory usage, a storage usage, a number of instructions being executed, a usage of one or more software libraries, a network activity, and a file access activity of the respective software component.

Another example (e.g., example 6) relates to a previously described example (e.g., one of the examples 3 to 5) or to any of the examples described herein, further comprising that the processing circuitry is configured to determine a combination of the expected behavior of the software components being executed or used in a software container to determine the information on the expected behavior of the software container.

Another example (e.g., example 7) relates to a previously described example (e.g., one of the examples 3 to 6) or to any of the examples described herein, further comprising that the information on the expected behavior of the software components is determined before hosting of the one or more software containers by the computer system, and wherein the information on the monitored behavior of the one or more software containers is determined during hosting of the one or more software containers.

Another example (e.g., example 8) relates to a previously described example (e.g., one of the examples 3 to 7) or to any of the examples described herein, further comprising that the information on the expected behavior of the software components originates from outside the computer system.

Another example (e.g., example 9) relates to a previously described example (e.g., one of the examples 1 to 8) or to any of the examples described herein, further comprising that the processing circuitry is configured to, if a software container is generated or composed from two or more building blocks or layers, determine the information on the expected behavior of the software container based on the expected behavior of the software components being executed or used in the two or more building blocks or layers.

Another example (e.g., example 10) relates to a previously described example (e.g., one of the examples 1 to 9) or to any of the examples described herein, further comprising that the behavior relates to one or more of a central processing unit usage, a graphics processing unit usage, a random-access memory usage, a storage usage, a number of instructions being executed, a usage of one or more software libraries, a network activity, and a file access activity of the respective software container.

Another example (e.g., example 11) relates to a previously described example (e.g., one of the examples 1 to 10) or to any of the examples described herein, further comprising that the expected behavior and the monitored behavior includes the behavior of one or more hardware devices of the computer system, the behavior being caused by the software components being executed or used in the one or more software containers.

Another example (e.g., example 12) relates to a previously described example (e.g., one of the examples 1 to 11) or to any of the examples described herein, further comprising that the processing circuitry is configured to determine a fault condition if the deviation between the expected behavior of the software container and the monitored behavior of the software container surpasses a threshold.

Another example (e.g., example 13) relates to a previously described example (e.g., example 12) or to any of the examples described herein, further comprising that the threshold is a user-defined threshold.

Another example (e.g., example 14) relates to a previously described example (e.g., one of the examples 1 to 13) or to any of the examples described herein, further comprising that the processing circuitry is configured to provide an alarm signal if a fault condition is determined.

Another example (e.g., example 15) relates to a previously described example (e.g., one of the examples 1 to 14) or to any of the examples described herein, further comprising that the processing circuitry is configured to restart the software container the fault condition is determined for if a fault condition is determined.

Another example (e.g., example 16) relates to a previously described example (e.g., one of the examples 1 to 15) or to any of the examples described herein, further comprising that the processing circuitry is configured to restore the software container the fault condition is determined for to a previous state if a fault condition is determined.

Another example (e.g., example 17) relates to a previously described example (e.g., one of the examples 1 to 16) or to any of the examples described herein, further comprising that the processing circuitry is configured to reset the software container the fault condition is determined for to an initial state if a fault condition is determined.

Another example (e.g., example 18) relates to a previously described example (e.g., one of the examples 15 to 17) or to any of the examples described herein, further comprising that the processing circuitry is configured to execute a sequence of measures including restarting the software container, restoring the software container to a previous state, and resetting the software container to an initial state as long as the fault condition is not resolved by a previous measure.

Another example (e.g., example 19) relates to a previously described example (e.g., one of the examples 1 to 18) or to any of the examples described herein, further comprising that the processing circuitry is configured to analyze the one or more software containers to determine the software components being executed or used in the one or more software containers.

Another example (e.g., example 20) relates to a previously described example (e.g., one of the examples 1 to 19) or to any of the examples described herein, further comprising that the processing circuitry is configured to host the one or more software containers, and to monitor the behavior of the one or more software containers to determine the information on the monitored behavior of the one or more software containers.

An example (e.g., example 21) relates to a computer system (100) comprising the apparatus (10) according to one of the examples 1 to 20 or according to any other example, the computer system being configured to host the one or more software containers (105).

An example (e.g., example 22) relates to an apparatus (20) for generating information on an expected behavior of software components of software containers, the apparatus comprising processing circuitry (24) configured to host one or more software containers, the one or more software containers comprising one or more software components being executed or used in the one or more software containers. The processing circuitry is configured to monitor the behavior of the one or more software components being executed or used in the one or more software containers. The processing circuitry is configured to determine information on an expected behavior of the one or more software components based on the monitored behavior of the one or more software components.

Another example (e.g., example 23) relates to a previously described example (e.g., example 22) or to any of the examples described herein, further comprising that the processing circuitry is configured to determine metrics characterizing the expected behavior of the respective software components, and to include the metrics in the information on the expected behavior of the one or more software components.

Another example (e.g., example 24) relates to a previously described example (e.g., example 23) or to any of the examples described herein, further comprising that the metrics relate to one or more of a central processing unit usage, a graphics processing unit usage, a random-access memory usage, a storage usage, a number of instructions being executed, a usage of one or more software libraries, a network activity, and a file access activity of the respective software component.

Another example (e.g., example 25) relates to a previously described example (e.g., one of the examples 22 to 24) or to any of the examples described herein, further comprising that the processing circuitry is configured to aggregate, for a software container comprising two or more software components, the information on the expected behavior based on the two or more software components.

Another example (e.g., example 26) relates to a previously described example (e.g., one of the examples 22 to 25) or to any of the examples described herein, further comprising that the processing circuitry is configured to aggregate, for a software container comprising two or more building blocks or layers, the information on the expected behavior based on the software components being executed or used in the two or more building blocks or layers.

An example (e.g., example 27) relates to a computer system (200) comprising the apparatus (20) according to one of the examples 22 to 26 or according to any other example.

An example (e.g., example 28) relates to a device (10) for monitoring one or more software containers (105) being hosted by a computer system (100), the device comprising means for processing (14) configured to determine information on an expected behavior of the one or more software containers based on respective software components being executed or used within the one or more software containers. The means for processing is configured determine information on a monitored behavior of the one or more software containers. The means for processing is configured determine a fault condition of a software container based on a deviation between the expected behavior of the software container and the monitored behavior of the software container.

Another example (e.g., example 29) relates to a previously described example (e.g., example 28) or to any of the examples described herein, further comprising that the software components comprise at least one of one or more software processes being executed in the respective software container and one or more software libraries being used in the respective software container.

Another example (e.g., example 30) relates to a previously described example (e.g., one of the examples 28 to 29) or to any of the examples described herein, further comprising that the means for processing is configured to determine the information on the expected behavior of the software container based on the respective software components being executed or used within the one or more software containers and based on a data storage comprising information on an expected behavior of software components.

Another example (e.g., example 31) relates to a previously described example (e.g., example 30) or to any of the examples described herein, further comprising that the information on the expected behavior of the software components comprises metrics characterizing the expected behavior of the software components.

Another example (e.g., example 32) relates to a previously described example (e.g., example 31) or to any of the examples described herein, further comprising that the metrics relate to one or more of a central processing unit usage, a graphics processing unit usage, a random-access memory usage, a storage usage, a number of instructions being executed, a usage of one or more software libraries, a network activity, and a file access activity of the respective software component.

Another example (e.g., example 33) relates to a previously described example (e.g., one of the examples 30 to 32) or to any of the examples described herein, further comprising that the means for processing is configured to determine a combination of the expected behavior of the software components being executed or used in a software container to determine the information on the expected behavior of the software container.

Another example (e.g., example 34) relates to a previously described example (e.g., one of the examples 30 to 33) or to any of the examples described herein, further comprising that the information on the expected behavior of the software components is determined before hosting of the one or more software containers by the computer system, and wherein the information on the monitored behavior of the one or more software containers is determined during hosting of the one or more software containers.

Another example (e.g., example 35) relates to a previously described example (e.g., one of the examples 30 to 34) or to any of the examples described herein, further comprising that the information on the expected behavior of the software components originates from outside the computer system.

Another example (e.g., example 36) relates to a previously described example (e.g., one of the examples 28 to 35) or to any of the examples described herein, further comprising that the means for processing is configured to, if a software container is generated or composed from two or more building blocks or layers, determine the information on the expected behavior of the software container based on the expected behavior of the software components being executed or used in the two or more building blocks or layers.

Another example (e.g., example 37) relates to a previously described example (e.g., one of the examples 28 to 36) or to any of the examples described herein, further comprising that the behavior relates to one or more of a central processing unit usage, a graphics processing unit usage, a random-access memory usage, a storage usage, a number of instructions being executed, a usage of one or more software libraries, a network activity, and a file access activity of the respective software container.

Another example (e.g., example 38) relates to a previously described example (e.g., one of the examples 28 to 37) or to any of the examples described herein, further comprising that the expected behavior and the monitored behavior includes the behavior of one or more hardware devices of the computer system, the behavior being caused by the software components being executed or used in the one or more software containers.

Another example (e.g., example 39) relates to a previously described example (e.g., one of the examples 28 to 38) or to any of the examples described herein, further comprising that the means for processing is configured to determine a fault condition if the deviation between the expected behavior of the software container and the monitored behavior of the software container surpasses a threshold.

Another example (e.g., example 40) relates to a previously described example (e.g., example 39) or to any of the examples described herein, further comprising that the threshold is a user-defined threshold.

Another example (e.g., example 41) relates to a previously described example (e.g., one of the examples 28 to 40) or to any of the examples described herein, further comprising that the means for processing is configured to provide an alarm signal if a fault condition is determined.

Another example (e.g., example 42) relates to a previously described example (e.g., one of the examples 28 to 41) or to any of the examples described herein, further comprising that the means for processing is configured to restart the software container the fault condition is determined for if a fault condition is determined.

Another example (e.g., example 43) relates to a previously described example (e.g., one of the examples 28 to 42) or to any of the examples described herein, further comprising that the means for processing is configured to restore the software container the fault condition is determined for to a previous state if a fault condition is determined.

Another example (e.g., example 44) relates to a previously described example (e.g., one of the examples 28 to 43) or to any of the examples described herein, further comprising that the means for processing is configured to reset the software container the fault condition is determined for to an initial state if a fault condition is determined.

Another example (e.g., example 45) relates to a previously described example (e.g., one of the examples 42 to 44) or to any of the examples described herein, further comprising that the means for processing is configured to execute a sequence of measures including restarting the software container, restoring the software container to a previous state, and resetting the software container to an initial state as long as the fault condition is not resolved by a previous measure.

Another example (e.g., example 46) relates to a previously described example (e.g., one of the examples 28 to 45) or to any of the examples described herein, further comprising that the means for processing is configured to analyze the one or more software containers to determine the software components being executed or used in the one or more software containers.

Another example (e.g., example 47) relates to a previously described example (e.g., one of the examples 28 to 46) or to any of the examples described herein, further comprising that the means for processing is configured to host the one or more software containers, and to monitor the behavior of the one or more software containers to determine the information on the monitored behavior of the one or more software containers.

An example (e.g., example 48) relates to a computer system (100) comprising the device (10) according to one of the examples 28 to 47 or according to any other example, the computer system being configured to host the one or more software containers (105).

An example (e.g., example 49) relates to a device (20) for generating information on an expected behavior of software components of software containers, the device comprising means for processing (24) configured to host one or more software containers, the one or more software containers comprising one or more software components being executed or used in the one or more software containers. The means for processing is configured to monitor the behavior of the one or more software components being executed or used in the one or more software containers. The means for processing is configured to determine information on an expected behavior of the one or more software components based on the monitored behavior of the one or more software components.

Another example (e.g., example 50) relates to a previously described example (e.g., example 49) or to any of the examples described herein, further comprising that the means for processing is configured to determine metrics characterizing the expected behavior of the respective software components, and to include the metrics in the information on the expected behavior of the one or more software components.

Another example (e.g., example 51) relates to a previously described example (e.g., example 50) or to any of the examples described herein, further comprising that the metrics relate to one or more of a central processing unit usage, a graphics processing unit usage, a random-access memory usage, a storage usage, a number of instructions being executed, a usage of one or more software libraries, a network activity, and a file access activity of the respective software component.

Another example (e.g., example 52) relates to a previously described example (e.g., one of the examples 49 to 51) or to any of the examples described herein, further comprising that the means for processing is configured to aggregate, for a software container comprising two or more software components, the information on the expected behavior based on the two or more software components.

Another example (e.g., example 53) relates to a previously described example (e.g., one of the examples 49 to 52) or to any of the examples described herein, further comprising that the means for processing is configured to aggregate, for a software container comprising two or more building blocks or layers, the information on the expected behavior based on the software components being executed or used in the two or more building blocks or layers.

An example (e.g., example 54) relates to a computer system (200) comprising the device (20) according to one of the examples 49 to 53 or according to any other example.

An example (e.g., example 55) relates to a method for monitoring one or more software containers (105) being hosted by a computer system (100), the method comprising determining (120) information on an expected behavior of the one or more software containers based on respective software components being executed or used within the one or more software containers. The method comprises determining (130) information on a monitored behavior of the one or more software containers. The method comprises determining (140) a fault condition of a software container based on a deviation between the expected behavior of the software container and the monitored behavior of the software container.

Another example (e.g., example 56) relates to a previously described example (e.g., example 55) or to any of the examples described herein, further comprising that the software components comprise at least one of one or more software processes being executed in the respective software container and one or more software libraries being used in the respective software container.

Another example (e.g., example 57) relates to a previously described example (e.g., one of the examples 55 to 56) or to any of the examples described herein, further comprising that the method comprises determining (120) the information on the expected behavior of the software container based on the respective software components being executed or used within the one or more software containers and based on a data storage comprising information on an expected behavior of software components.

Another example (e.g., example 58) relates to a previously described example (e.g., example 57) or to any of the examples described herein, further comprising that the information on the expected behavior of the software components comprises metrics characterizing the expected behavior of the software components.

Another example (e.g., example 59) relates to a previously described example (e.g., example 58) or to any of the examples described herein, further comprising that the metrics relate to one or more of a central processing unit usage, a graphics processing unit usage, a random-access memory usage, a storage usage, a number of instructions being executed, a usage of one or more software libraries, a network activity, and a file access activity of the respective software component.

Another example (e.g., example 60) relates to a previously described example (e.g., one of the examples 57 to 59) or to any of the examples described herein, further comprising that the method comprises determining a combination of the expected behavior of the software components being executed or used in a software container to determine (120) the information on the expected behavior of the software container.

Another example (e.g., example 61) relates to a previously described example (e.g., one of the examples 57 to 60) or to any of the examples described herein, further comprising that the information on the expected behavior of the software components is determined before hosting of the one or more software containers by the computer system, and wherein the information on the monitored behavior of the one or more software containers is determined during hosting of the one or more software containers.

Another example (e.g., example 62) relates to a previously described example (e.g., one of the examples 57 to 61) or to any of the examples described herein, further comprising that the information on the expected behavior of the software components originates from outside the computer system.

Another example (e.g., example 63) relates to a previously described example (e.g., one of the examples 55 to 62) or to any of the examples described herein, further comprising that the method comprises, if a software container is generated or composed from two or more building blocks or layers, determining (120) the information on the expected behavior of the software container based on the expected behavior of the software components being executed or used in the two or more building blocks or layers.

Another example (e.g., example 64) relates to a previously described example (e.g., one of the examples 55 to 63) or to any of the examples described herein, further comprising that the behavior relates to one or more of a central processing unit usage, a graphics processing unit usage, a random-access memory usage, a storage usage, a number of instructions being executed, a usage of one or more software libraries, a network activity, and a file access activity of the respective software container.

Another example (e.g., example 65) relates to a previously described example (e.g., one of the examples 55 to 64) or to any of the examples described herein, further comprising that the expected behavior and the monitored behavior includes the behavior of one or more hardware devices of the computer system, the behavior being caused by the software components being executed or used in the one or more software containers.

Another example (e.g., example 66) relates to a previously described example (e.g., one of the examples 55 to 65) or to any of the examples described herein, further comprising that the method comprises determining (140) a fault condition if the deviation between the expected behavior of the software container and the monitored behavior of the software container surpasses a threshold.

Another example (e.g., example 67) relates to a previously described example (e.g., example 66) or to any of the examples described herein, further comprising that the threshold is a user-defined threshold.

Another example (e.g., example 68) relates to a previously described example (e.g., one of the examples 55 to 67) or to any of the examples described herein, further comprising that the method comprises providing (150) an alarm signal if a fault condition is determined.

Another example (e.g., example 69) relates to a previously described example (e.g., one of the examples 55 to 68) or to any of the examples described herein, further comprising that the method comprises restarting (162) the software container the fault condition is determined for if a fault condition is determined.

Another example (e.g., example 70) relates to a previously described example (e.g., one of the examples 55 to 69) or to any of the examples described herein, further comprising that the method comprises restoring (164) the software container the fault condition is determined for to a previous state if a fault condition is determined.

Another example (e.g., example 71) relates to a previously described example (e.g., one of the examples 55 to 60) or to any of the examples described herein, further comprising that the method comprises resetting (166) the software container the fault condition is determined for to an initial state if a fault condition is determined.

Another example (e.g., example 72) relates to a previously described example (e.g., one of the examples 69 to 71) or to any of the examples described herein, further comprising that the method comprises executing (160) a sequence of measures including restarting (162) the software container, restoring (164) the software container to a previous state, and resetting (166) the software container to an initial state as long as the fault condition is not resolved by a previous measure.

Another example (e.g., example 73) relates to a previously described example (e.g., one of the examples 55 to 72) or to any of the examples described herein, further comprising that the method comprises analyzing (115) the one or more software containers to determine the software components being executed or used in the one or more software containers.

Another example (e.g., example 74) relates to a previously described example (e.g., one of the examples 55 to 73) or to any of the examples described herein, further comprising that the method comprises hosting (132) the one or more software containers, and monitoring (134) the behavior of the one or more software containers to determine the information on the monitored behavior of the one or more software containers.

An example (e.g., example 75) relates to a computer system (100) being configured to perform the method according to one of the examples 55 to 74 or according to any other example, the computer system being configured to host the one or more software containers (105).

An example (e.g., example 76) relates to a method for generating information on an expected behavior of software components of software containers, the method comprising hosting (210) one or more software containers, the one or more software containers comprising one or more software components being executed or used in the one or more software containers. The method comprises monitoring (220) the behavior of the one or more software components being executed or used in the one or more software containers. The method comprises determining (230) information on an expected behavior of the one or more software components based on the monitored behavior of the one or more software components.

Another example (e.g., example 77) relates to a previously described example (e.g., example 76) or to any of the examples described herein, further comprising that the method comprises determining (232) metrics characterizing the expected behavior of the respective software components and including the metrics in the information on the expected behavior of the one or more software components.

Another example (e.g., example 78) relates to a previously described example (e.g., example 77) or to any of the examples described herein, further comprising that the metrics relate to one or more of a central processing unit usage, a graphics processing unit usage, a random-access memory usage, a storage usage, a number of instructions being executed, a usage of one or more software libraries, a network activity, and a file access activity of the respective software component.

Another example (e.g., example 79) relates to a previously described example (e.g., one of the examples 76 to 78) or to any of the examples described herein, further comprising that the method comprises aggregating (234), for a software container comprising two or more software components, the information on the expected behavior based on the two or more software components.

Another example (e.g., example 80) relates to a previously described example (e.g., one of the examples 76 to 79) or to any of the examples described herein, further comprising that the method comprises aggregating, for a software container comprising two or more building blocks or layers (234), the information on the expected behavior based on the software components being executed or used in the two or more building blocks or layers.

An example (e.g., example 81) relates to a computer system (200) being configured to perform the method according to one of the examples 76 to 80 or according to any other example.

An example (e.g., example 82) relates to a non-transitory machine-readable storage medium including program code, when executed, to cause a machine to perform the method of one of the examples 55 to 74 or the method of one of the examples 76 to 80 or according to any other example.

An example (e.g., example 83) relates to a computer program having a program code for performing the method of one of the examples 55 to 74 or the method of one of the examples 76 to 80 or according to any other example when the computer program is executed on a computer, a processor, or a programmable hardware component.

An example (e.g., example 84) relates to a machine-readable storage including machine readable instructions, when executed, to implement a method or realize an apparatus as claimed in any pending claim or shown in any example.

Examples may further be or relate to a (computer) program including a program code to execute one or more of the above methods when the program is executed on a computer, processor, or other programmable hardware component. Thus, steps, operations, or processes of different ones of the methods described above may also be executed by programmed computers, processors, or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations, or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process, or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

As used herein, the term "module" refers to logic that may be implemented in a hardware component or device, software or firmware running on a processing unit, or a combination thereof, to perform one or more operations consistent with the present disclosure. Software and firmware may be embodied as instructions and/or data stored on non-transitory computer-readable storage media. As used herein, the term "circuitry" can comprise, singly or in any combination, non-programmable (hardwired) circuitry, programmable circuitry such as processing units, state machine circuitry, and/or firmware that stores instructions executable by programmable circuitry. Modules described herein may, collectively or individually, be embodied as circuitry that forms a part of a computing system. Thus, any of the modules can be implemented as circuitry. A computing system referred to as being programmed to perform a method can be programmed to perform the method via software, hardware, firmware, or combinations thereof.

Any of the disclosed methods (or a portion thereof) can be implemented as computer-executable instructions or a computer program product. Such instructions can cause a computing system or one or more processing units capable of executing computer-executable instructions to perform any of the disclosed methods. As used herein, the term "computer" refers to any computing system or device described or mentioned herein. Thus, the term "computer-executable instruction" refers to instructions that can be executed by any computing system or device described or mentioned herein.

The computer-executable instructions can be part of, for example, an operating system of the computing system, an application stored locally to the computing system, or a remote application accessible to the computing system (e.g., via a web browser). Any of the methods described herein can be performed by computer-executable instructions performed by a single computing system or by one or more networked computing systems operating in a network environment. Computer-executable instructions and updates to the computer-executable instructions can be downloaded to a computing system from a remote server.

Further, it is to be understood that implementation of the disclosed technologies is not limited to any specific computer language or program. For instance, the disclosed technologies can be implemented by software written in C++, C#, Java, Perl, Python, JavaScript, Adobe Flash, C#, assembly language, or any other programming language. Likewise, the disclosed technologies are not limited to any particular computer system or type of hardware.

Furthermore, any of the software-based examples (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, cable (including fiber optic cable), magnetic communications, electromagnetic communications (including RF, microwave, ultrasonic, and infrared communications), electronic communications, or other such communication means.

The disclosed methods, apparatuses, and systems are not to be construed as limiting in any way. Instead, the present disclosure is directed toward all novel and nonobvious features and aspects of the various disclosed examples, alone and in various combinations and subcombinations with one another. The disclosed methods, apparatuses, and systems are not limited to any specific aspect or feature or combination thereof, nor do the disclosed examples require that any one or more specific advantages be present, or problems be solved.

Theories of operation, scientific principles, or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:

1. An apparatus for monitoring one or more software containers being hosted by a computer system, the apparatus comprising processing circuitry configured to:

determine information on an expected behavior of the one or more software containers based on respective software components being executed or used within the one or more software containers and based on an outside data storage comprising information on an expected behavior of software components;

determine information on a monitored behavior of the one or more software containers; and determine a fault condition of a software container based on a deviation between the expected behavior of the software container and the monitored behavior of the software container.

2. The apparatus according to claim 1, wherein the software components comprise at least one of one or more software processes being executed in the respective software container and one or more software libraries being used in the respective software container.

3. The apparatus according to claim 1, wherein the information on the expected behavior of the software components comprises metrics characterizing the expected behavior of the software components.

4. The apparatus according to claim 3, wherein the metrics relate to one or more of a central processing unit usage, a graphics processing unit usage, a random-access memory usage, a storage usage, a number of instructions being executed, a usage of one or more software libraries, a network activity, and a file access activity of the respective software component.

5. The apparatus according to claim 1, wherein the processing circuitry is configured to determine a combination of the expected behavior of the software components being executed or used within the software container to determine the information on the expected behavior of the software container.

6. The apparatus according to claim 1, wherein the information on the expected behavior of the software components is determined before hosting of the one or more software containers by the computer system, and wherein the information on the monitored behavior of the one or more software containers is determined during hosting of the one or more software containers.

7. The apparatus according to claim 1, wherein the information on the expected behavior of the software components originates from outside the computer system.

8. The apparatus according to claim 1, wherein the processing circuitry is configured to, if a software container is generated or composed from two or more building blocks or layers, determine the information on the expected behavior of the software container based on the expected behavior of the software components being executed or used in the two or more building blocks or layers.

9. The apparatus according to claim 1, wherein the behavior relates to one or more of a central processing unit usage, a graphics processing unit usage, a random-access memory usage, a storage usage, a number of instructions being executed, a usage of one or more software libraries, a network activity, and a file access activity of the respective software container.

10. The apparatus according to claim 1, wherein the expected behavior and the monitored behavior includes the behavior of one or more hardware devices of the computer system, the behavior being caused by the software components being executed or used in the one or more software containers.

11. The apparatus according to claim 1, wherein the processing circuitry is configured to determine a fault condition if the deviation between the expected behavior of the software container and the monitored behavior of the software container surpasses a user-defined threshold.

12. The apparatus according to claim 1, wherein the processing circuitry is configured to restart the software container the fault condition is determined for when the fault condition is determined, to restore the software container the fault condition is determined for to a previous state when the fault condition is determined, and/or to reset the software container the fault condition is determined for to an initial state when the fault condition is determined.

13. The apparatus according to claim 12, wherein the processing circuitry is configured to execute a sequence of measures including restarting the software container, restoring the software container to the previous state, and resetting the software container to the initial state as long as the fault condition is not resolved by a previous measure.

14. The apparatus according to claim 1, wherein the processing circuitry is configured to analyze the one or more software containers to determine the software components being executed or used in the one or more software containers.

15. The apparatus according to claim 1, wherein the processing circuitry is configured to host the one or more software containers, and to monitor the behavior of the one or more software containers to determine the information on the monitored behavior of the one or more software containers.

16. A method for monitoring one or more software containers being hosted by a computer system, the method comprising:

determining information on an expected behavior of the one or more software containers based on respective software components being executed or used within the one or more software containers and based on an outside data storage comprising information on an expected behavior of software components;

determining information on a monitored behavior of the one or more software containers; and determining a fault condition of a software container based on a deviation between the expected behavior of the software container and the monitored behavior of the software container.

17. A non-transitory, computer-readable storage medium including program code that, when executed on a computer, processor, or programmable hardware component cause the computer, processor, or programmable hardware component to perform the method of claim 16.

* * * * *